US009781201B2

(12) United States Patent
Tracht et al.

(10) Patent No.: US 9,781,201 B2
(45) Date of Patent: Oct. 3, 2017

(54) MULTICAST TRANSPORT

(71) Applicant: NetApp Inc., Sunnyvale, CA (US)

(72) Inventors: Allen E. Tracht, Fox Chapel, PA (US); Curtis Anderson, Saratoga, CA (US); Tabriz Holtz, Los Gatos, CA (US); George Totolos, Jr., Cranberry Township, PA (US)

(73) Assignee: NetApp Inc., Sunnyvale, CA (US)

( * ) Notice: Subject to any disclaimer, the term of this patent is extended or adjusted under 35 U.S.C. 154(b) by 426 days.

(21) Appl. No.: 14/515,451

(22) Filed: Oct. 15, 2014

(65) Prior Publication Data

US 2016/0112509 A1   Apr. 21, 2016

(51) Int. Cl.
*G06F 15/16* (2006.01)
*H04L 29/08* (2006.01)
*H04L 12/18* (2006.01)

(52) U.S. Cl.
CPC ...... *H04L 67/1095* (2013.01); *H04L 12/1863* (2013.01); *H04L 67/1097* (2013.01)

(58) Field of Classification Search
USPC ................................. 709/202, 217, 218, 248
See application file for complete search history.

(56) References Cited

U.S. PATENT DOCUMENTS

| | | | |
|---|---|---|---|
| 2002/0152194 A1* | 10/2002 | Sathyanarayan | G06F 17/30073 |
| 2003/0149830 A1* | 8/2003 | Torr | G06F 3/0601 711/100 |
| 2006/0080362 A1* | 4/2006 | Wagner | G06F 3/0611 |
| 2006/0107005 A1* | 5/2006 | Philippe Andre | G06F 11/1441 711/162 |
| 2007/0180191 A1* | 8/2007 | Satoyama | G06F 11/2069 711/114 |
| 2007/0244571 A1* | 10/2007 | Wilson | G05B 19/042 700/11 |
| 2007/0248311 A1* | 10/2007 | Wice | G11B 27/10 386/231 |
| 2010/0011079 A1* | 1/2010 | Hitchcock | G06Q 10/107 709/206 |

* cited by examiner

*Primary Examiner* — Liangche A Wang
(74) *Attorney, Agent, or Firm* — LeClairRyan, a Professional Corporation

(57) ABSTRACT

One or more techniques and/or systems are provided for multicast transport configuration, for multicast transport, and/or for fault policy implementation. In an example, a multicast component may receive a data copy request from an application to copy data to multiple destinations. A scheduler component may create a transport schedule specifying an order with which to facilitate data copy operations across transports, such as heterogeneous transports, to the destinations. A dispatcher component may apply application specified transport modifiers to the data copy operations (e.g., a modification to a quality of service for a transport). The dispatcher component may facilitate the data copy operations and provide operation result information to a policy agent. The policy agent may provide notifications of data copy operation statuses from the operation result information and/or may implement a fault policy (e.g., a retry on a different transport) for a data copy operation that experienced a fault.

12 Claims, 17 Drawing Sheets

MULTICAST TRANSPORT

BACKGROUND

A computing environment may comprise various types of storage configurations, such as a cluster storage network, locally attached storage, a high availability pairing of two storage nodes where a primary storage node provides clients within access to data on storage devices and a secondary storage node acts as a failover node for the primary node, etc. A client may determine that data is to be copied to one or more destinations. For example, the client may implement a mirroring command where data from a first storage node is to be mirrored to plurality of destinations, such as a second storage node, a third storage node, etc., over various types of transports that may be heterogeneous.

Unfortunately, the client may implement separate data copy commands per destination and transport because merely a single data copy command over a single transport type to a single destination may be supported. Implementing a plurality of data copy commands may be computationally burdensome on the client because additional processing resources and/or bandwidth may be used for the data copy commands. Additionally, the client will need intimate knowledge about how to implement the various types of transports since the transports (e.g., TCP, IP, Ethernet, a local storage protocol used to access locally attaches storage, a cluster to cluster communication protocol, an inter-cluster data protocol, or any other storage protocol) and/or the destination may be heterogeneous. For example, the client may need to understand various aspects of a local storage protocol, a remote storage protocol, a high availability pairing protocol, a cluster storage protocol, etc. Thus, memory, processor, and/or bandwidth resources may be consumed by protocol aware software on the client for separately implementing the data copy commands over the various types of transports. Additionally, if a particular protocol aware software application is not available to the client, then the client may be unable to mirror the data over a corresponding transport to a destination storage node.

DETAILED DESCRIPTION

Figure 1:
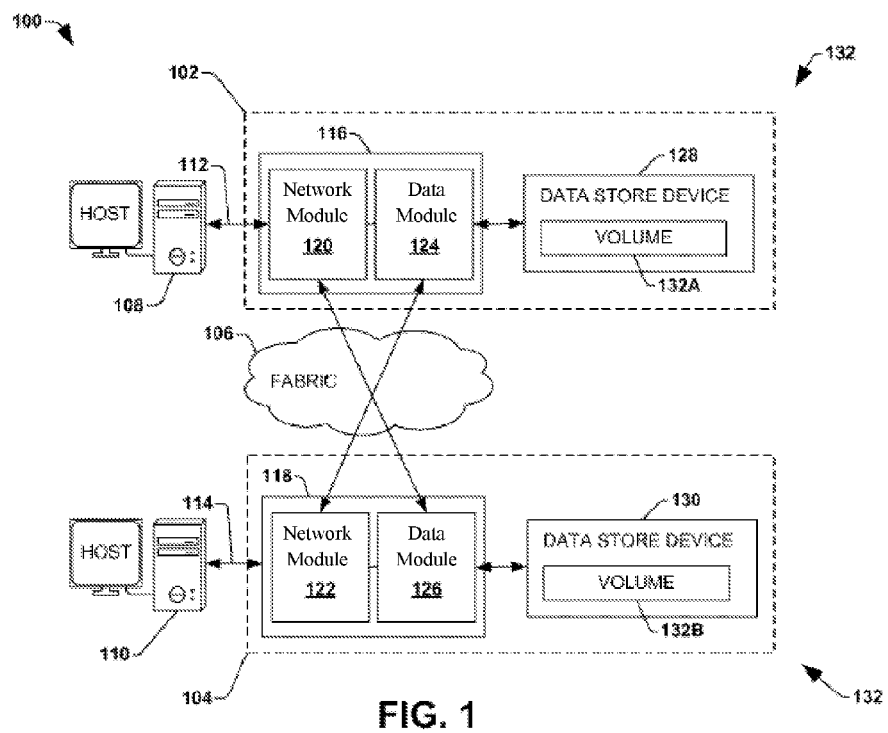
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more systems and/or techniques for multicast transport configuration, for multicast transport, and for fault policy implementation are provided herein. A multicast component may be configured to receive a data copy request from a data management component, such as an application associated with a storage environment (e.g., a local storage environment with an attached storage device; a high availability pairing storage environment of multiple storage nodes where a primary node services client I/O requests and a secondary node provides failover operation if the primary nodes fails; a cluster network storage environment; etc.). The data copy request may indicate that data is to be copied to multiple destinations over various transports (e.g., heterogeneous transports such as TCP, IP, a local storage protocol, a cluster storage protocol, a storage aggregate storage protocol, etc.). The multicast component may facilitate data copy operations over the various transports (e.g., a first data copy operation over a first transport to a first destination and a second data copy operation over a second transport to a second destination). The multicast component may implement application specified transport modifiers used to modify data copy operation logic used to facilitate the data copy operations (e.g., a change to a quality of service, such as a latency metric, a bandwidth metric, a failure recovery metric, etc.). It may be appreciated that a first data copy operation and a second data copy operation are used herein for illustrative purposes, and that any number of data copy operations of a data copy request may be evaluated and/or facilitated (e.g., a policy may indicate that no data copy operations of a data copy request should be facilitated; a single data copy operation of a data copy request may be facilitated; three or more data copy operations of a data copy request may be facilitated; etc.).

A policy agent may be configured to implement a fault policy to address a fault that may arise from a data copy operation (e.g., retry a transport, attempt a different transport, etc.). The policy agent may provide primitive notifications of data copy operations and/or may provide aggregate notifications of a transport to notification targets such as the application, the multicast component, a storage application, etc. Multicast transport abstracts away the data copy operation logic for moving data over heterogeneous transports from clients and destinations. In this way, a client may issue a single data copy request to copy data to multiple destinations, and the multicast component may facilitate multiple data copy operations to the multiple destinations (e.g., over heterogeneous transports) on behalf of the client without the client and/or the destinations having knowledge of the data copy operation logic.

To provide context for multicast transport configuration, for multicast transport, and for fault policy implementation, FIG. 1 illustrates an embodiment of a clustered network environment (e.g., a clustered storage environment, a storage cluster, etc.) or a network storage environment 100. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 (e.g., a clustered storage environment, a storage cluster, etc.) that may implement at least some embodiments of the techniques and/or systems described herein. The example environment 100 comprises data storage systems or storage sites 102 and 104 that are coupled over a cluster fabric 106, such as a computing network embodied as a private Infiniband or Fibre Channel (FC) network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more network connections 112, 114.

The nodes 116, 118 on clustered data storage systems 102, 104 can comprise network or host nodes that are interconnected as a cluster to provide data storage and management services, such as to an enterprise having remote locations, for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the exemplary environment 100, nodes 116, 118 can comprise various functional components that coordinate to provide distributed storage architecture for the cluster. For example, the nodes can comprise a network module 120, 122 and a data module 124, 126. Network modules 120, 122 can be configured to allow the nodes 116, 118 (e.g., network storage controllers) to connect with host devices 108, 110 over the network connections 112, 114, for example, allowing the host devices 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of N and D modules, other embodiments may comprise a differing number of these modules. For example, there may be a plurality of N and/or D modules interconnected in a cluster that does not have a one-to-one correspondence between the N and D modules. That is, different nodes can have a different number of N and D modules, and the same node can have a different number of N modules than D modules.

Further, a host device 108, 110 can be networked with the nodes 116, 118 in the cluster, over the networking connections 112, 114. As an example, respective host devices 108, 110 that are networked to a cluster may request services (e.g., exchanging of information in the form of data packets) of a node 116, 118 in the cluster, and the node 116, 118 can return results of the requested services to the host devices 108, 110. In one embodiment, the host devices 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the storage volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

It may be appreciated that multicast transport configuration, multicast transport, and/or fault policy implementation may be implemented within the clustered network environment 100 or any other storage or other networked data-processing environment (e.g., a high availability node pairing, locally attached storage devices, etc.). For example, a multicast component, a scheduler component, a dispatcher component, a data management component, and/or a policy agent may be implemented for the node 116, the node 118, the host 108, and/or the host 110. In this way, the host 108 and/or the host 110 may issue a single data copy request that may be used to copy data to multiple destinations over various types of transports, such as to the node 116, the node 118, and/or other nodes not illustrated.

The network may be any data communication path such as circuitry within an integrated circuit (e.g., of processor 204), connections among integrated circuits on a printed-circuit board (e.g., of system bus 242), connections routed through an electrical connector or other printed circuit boards (e.g., of system bus 242), electrical or optical cables within a computing system or between computing systems (e.g., associated with cluster fabric 215), or the connections provided by a third party for communication, such as the internet, associated with network 216.

Figure 2:
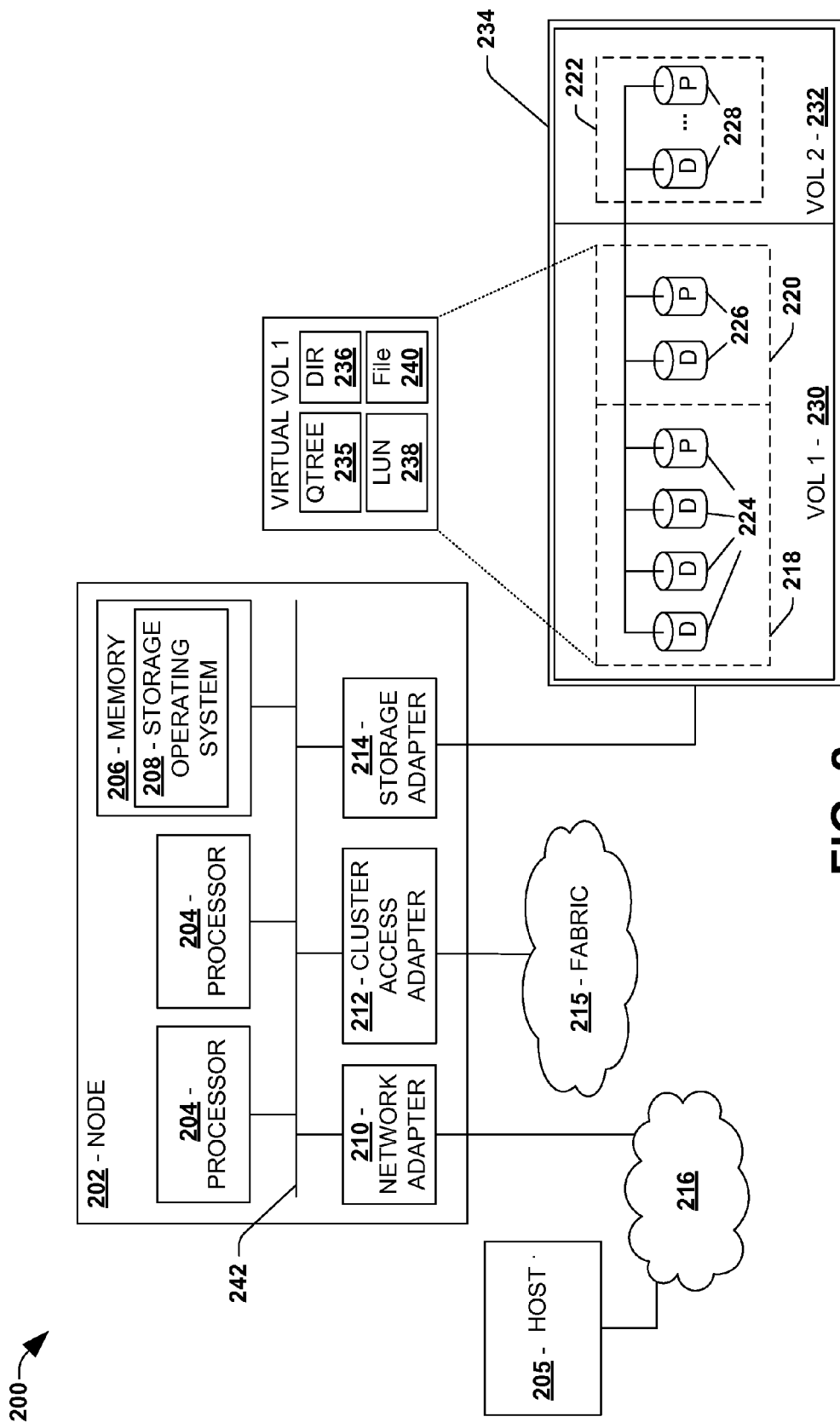
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a computer network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that multicast transport configuration, multicast transport, and/or fault policy implementation may be implemented for the data storage system 200 or any other storage or other networked data-processing environment (e.g., a high availability node pairing, locally attached storage devices, etc.). For example, a multicast component, a scheduler component, a dispatcher component, a data management component, and/or a policy agent may be implemented for the node 202 and/or the host 205. In this way, the host 205 may issue a single data copy request that may be used to copy data to multiple destinations over various types of transports, such as to the node 202 and/or other nodes not illustrated.

Figure 3:
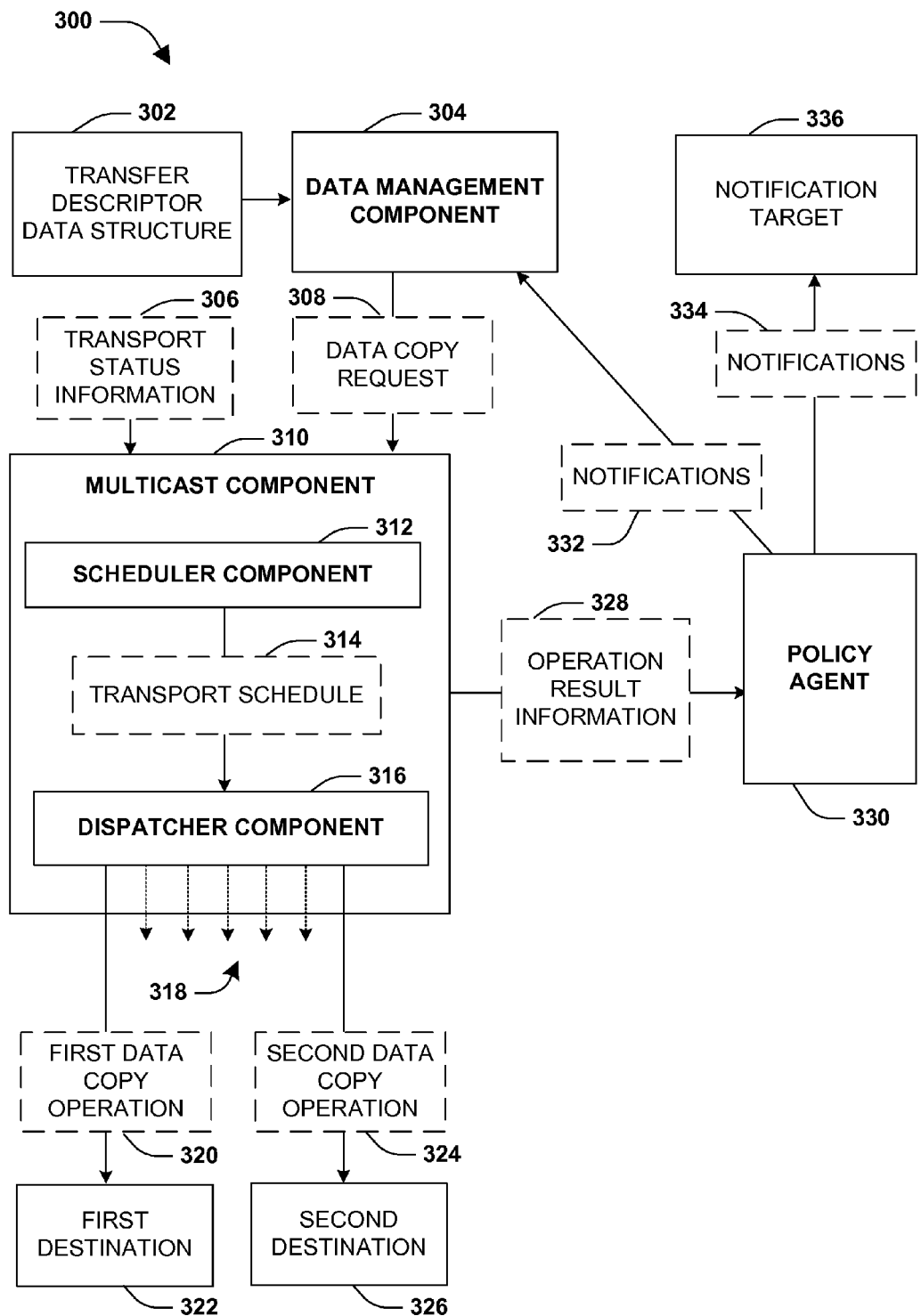
FIG. 3 is a component block diagram illustrating an exemplary system for multicast transport.

FIG. 3 illustrates an example of a system 300 for multicast transport. The system 300 may comprise a multicast component 310 comprising a scheduler component 312 and a dispatcher component 316. The scheduler component 312 may receive a data copy request 308, to copy data to multiple destinations, from a data management component 304. For example, the data management component 304 may be associated with a storage application configured to manage the storage of data amongst one or more destinations (e.g., mirroring data, managing NVRAMs, data logging, storage aggregate management, volume creation, storage backup, storage node recovery, etc.). The data copy request 308 may comprise a transfer descriptor obtained from a transfer descriptor data structure 302 by the data management component 304. The transfer descriptor may correspond to prepackaged models and/or algorithms for performing storage tasks, such as logic about how to mirror data between primary memory of a primary node and secondary memory of a secondary node of a high availability node pairing. The data copy request 308 may comprise data locational information for the data that is to be copied, destination address information (e.g., an abstract destination address that may be translated into destination addresses for the particular destinations to which the data is to be copied), and/or data copy operation order information (e.g., a first data copy operation 320 of the data over a first transport to a first destination 322 may need to be performed after completion of a second data copy operation 324 of the data over a second transport to a second destination 326). In an example, the data copy request 308 may comprise an application specified transport modifier that is to be used to modify data copy operation logic (e.g., a modifier to a quality of service for the first data copy operation 320; a quality of service emulation to apply to the second data copy operation 324, etc.).

The scheduler component 312 may identify a first transport over which first data of the data copy request 306 can be transported to the first destination 322 and a second transport over which second data (e.g., the same or different data as the first data) of the data copy request 308 can be transported to the second destination 326. For example, the transfer descriptor of the data copy request 308 may identify which transports are available to use. The scheduler component 312 may obtain transport status information 306. The transport status information 306 may specify a transport path availability, a transport path data rate, a transport path topology, a transport path performance, and/or other information about a transport path of a transport. In this way, the scheduler component 312 may create a transport schedule 314 for the first data copy operation 320, the second data copy operation 324, and/or other data copy operations (e.g., an ordered sequence of data copy operations that may be performed in parallel or serially based upon dependencies of data copy operation completions) based upon the transport status information 306 and/or the data copy request 308.

The dispatcher component 316 may be configured to facilitate the first data copy operation 320 over the first transport to the first destination 322 based upon first transport characteristics of the first transport (e.g., utilizing data copy operation logic of the transfer descriptor) and the transport schedule 314. The dispatcher component 316 may be configured to facilitate the second data copy operation 324 over the second transport to the second destination 326 based upon second transport characteristics of the second transport (e.g., utilizing data copy operation logic of the transfer descriptor) and the transport schedule 314. In this way, multiple data copy operations may be performed over various transports 318, such as heterogeneous transports, to multiple destinations based upon the single data copy request 308 from the data management component 304, such that the data management component (e.g., the storage application) and/or the destinations do not need to be aware of the multiple transports.

A policy agent 330 may receive operation result information 328 associated with the first data copy operation 320, the second data copy operation 324, and/or other data copy operations. The policy agent 330 may be configured to provide notifications 332 to the data management component 304 and/or notifications 334 to notifications targets 336 (e.g., specified by the data management component 304, such as through the data copy request 308) about faults associated with data copy operations, successful completions of data copy operations, and/or other data copy operation information (e.g. a measured latency, a time to complete a data copy operation, etc.). In an example, primitive notifications of whether a data copy operation was successful or faulted may be provided. In another example, aggregate notifications of a transport status for an aggregate of data copy operations associated with a transport may be provided. Responsive to the operation result information 328 indicating a fault associated with a data copy operation, a fault policy may be implemented to address the fault. For example, a retry data copy operation may be retried over the first transport or an alternative transport based upon a fault of the first data copy operation 320.

Figure 4:
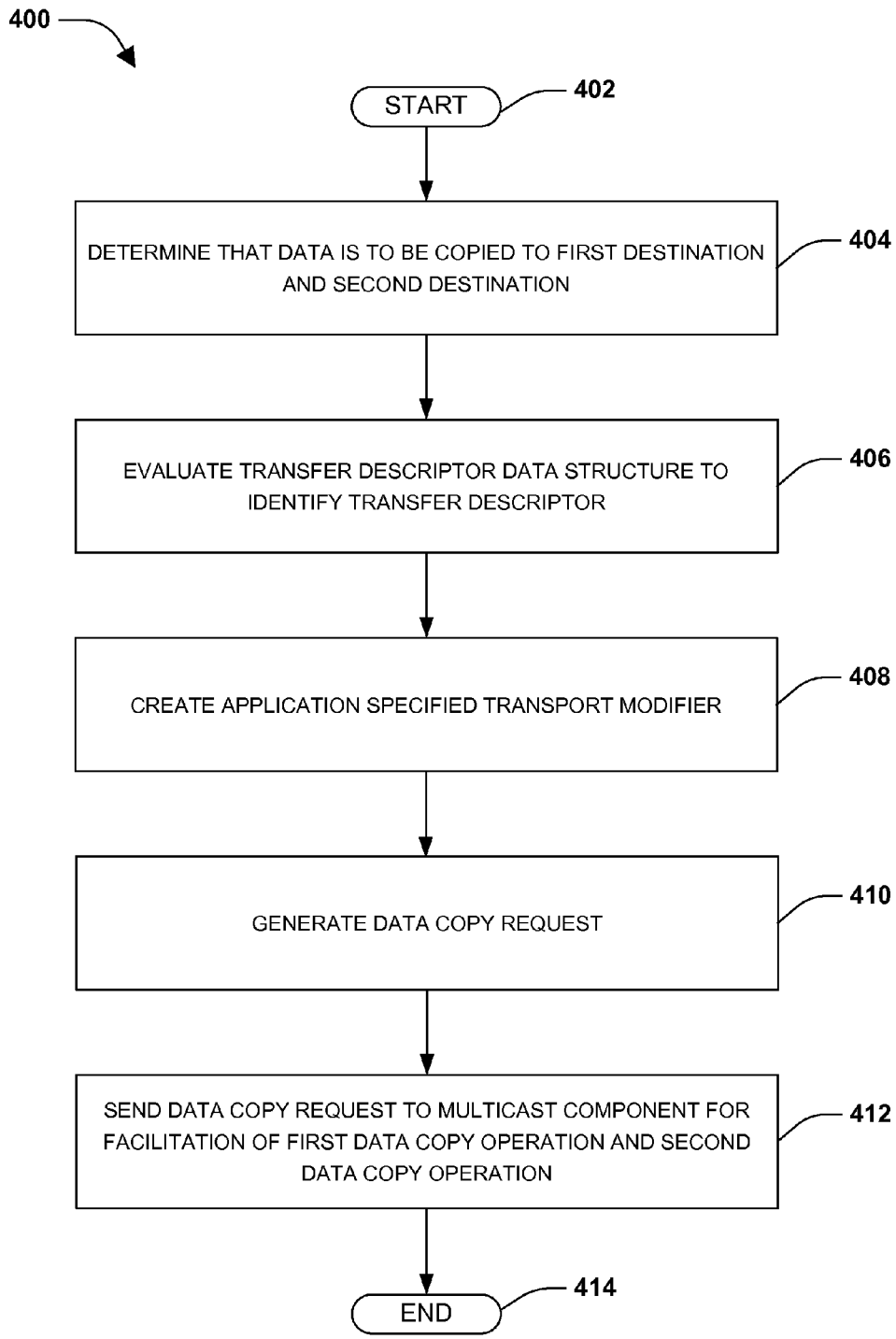
FIG. 4 is a flow chart illustrating an exemplary method of multicast transport configuration.

One embodiment of multicast transport configuration is illustrated by an exemplary method 400 of FIG. 4. At 402, the method starts. At 404, data that is to be copied to a first destination, a second destination, and/or other destinations may be identified (e.g., a storage application may determine that storage operating system log entries are to be mirrored locally on a primary storage node of a first storage cluster, to a secondary storage node that is paired with the primary storage node, and to second storage cluster). At 406, a transfer descriptor data structure may be evaluated to identify a transfer descriptor comprising data copy operation logic for moving the data to the first destination using a first transport (e.g., models and/or algorithms for mirroring storage operating system log entries to locally attached storage of the primary storage node using a local storage protocol) and for moving the data to the second destination using a second transport (e.g., models and/or algorithms for mirroring storage operating system log entries to the secondary storage node).

At 408, an application specified transport modifier may be created (e.g., by a data management component of the storage application). The application specified transport modifier may define a modification for an implementation of the data copy operation logic (e.g., a transport characteristic modifier used to modify how a transport is used, such as how to recover from a data packet loss, a timeout threshold change, a latency change, a bandwidth change, a data rate change, etc.). In an example, the application specified transport modifier may specify a first modification that is to be to applied to the first data copy operation (e.g., latency metric modifier to increase a latency quality of service metric) and/or a second modification that is to be applied to the second data copy operation (e.g., a bandwidth metric modifier to reduce a bandwidth constraint). In an example, a quality of service metric for a transport may be identified, and the application specified transport modifier may be created as a modification to the quality of service metric. In an example, the application specified transport modifier may specify a quality of service metric to implement for the first data copy operation and/or the second data copy operation. In an example, the application specified transport modifier may specify a quality of service emulation (e.g., a quality of service metric not natively supported by the first transport) to apply to the first data copy operation.

At 410, a data copy request may be generated based upon the transfer descriptor and the application specified transport modifier. The data copy request may comprise data copy operation ordering information. The data copy operation ordering information may indicate dependencies between data copy operations, whether parallel execution is allowed, and/or whether serial execution is to be performed for data copy operations. The data copy request may specify an abstract destination identifier for the first destination, the second destination, and/or other destinations. In this way, the storage application may merely specify a single abstract destination identifier, which may be interpreted for respective destination by a multicast component that is configured to facilitate the data copy operations. The data copy request may comprise the transfer descriptor, data locational information for the storage operating system log entries that are to be copied, and/or other information.

In an example, a primitive notification instruction may be specified for inclusion within the data copy request. The primitive notification instruction may be used by a policy agent for processing operation result information associated with data copy operations. The primary notification instruction may comprise filters used for determining whether to send or not to send notifications (e.g., a first filter specifying that the policy agent is to send a notification to a notification target for a first type of status such as a retry status). For example, the primitive notification instruction may instruct the policy agent to send fault notifications for data copy operations to the storage application.

In an example, an aggregate notification instruction may be specified for inclusion within the data copy request. The aggregate notification instruction may be used by the policy agent for processing a set of operation result information associated with an aggregate of data copy operations associated with the first transport. For example, the aggregate instruction may instruct the policy agent to notify an application or a higher level management function of a failure of a transport and/or to create an entry within the transfer descriptor data structure that the transport is unavailable and that further data copy operations may not be attempted over the first transport until the first transport is specified as available.

At 412, the data copy request may be sent to a multicast component for facilitation of the first data copy operation over the first transport to the first destination and/or for facilitation of the second data copy operation over the second transport to the second destination. The first data copy operation and/or the second data copy operation may be modified based upon the application specified transport modifier (e.g., the latency metric modifier may be applied to the first data copy operation and/or the bandwidth metric modifier may be applied to the second data copy operation). In an example of facilitating the first data copy operation, the transfer descriptor data structure may be evaluated to determine that the first transport has an unavailable status (e.g., a previous data copy operation over the first transport may have faulted). A third transport (e.g., a different transport path) over which the data can be transport to the first destination may be identified. The first data copy operation may be facilitated over the third transport to the first destination. A notification, indicating a status of data copy operations, may be received (e.g., the policy agent may send a success notification to the storage application). In this way, multicast transport for moving data to multiple destinations based upon a single data copy request may be facilitated and customized based upon application specified transport modifiers. At 414, the method ends.

Figure 5:
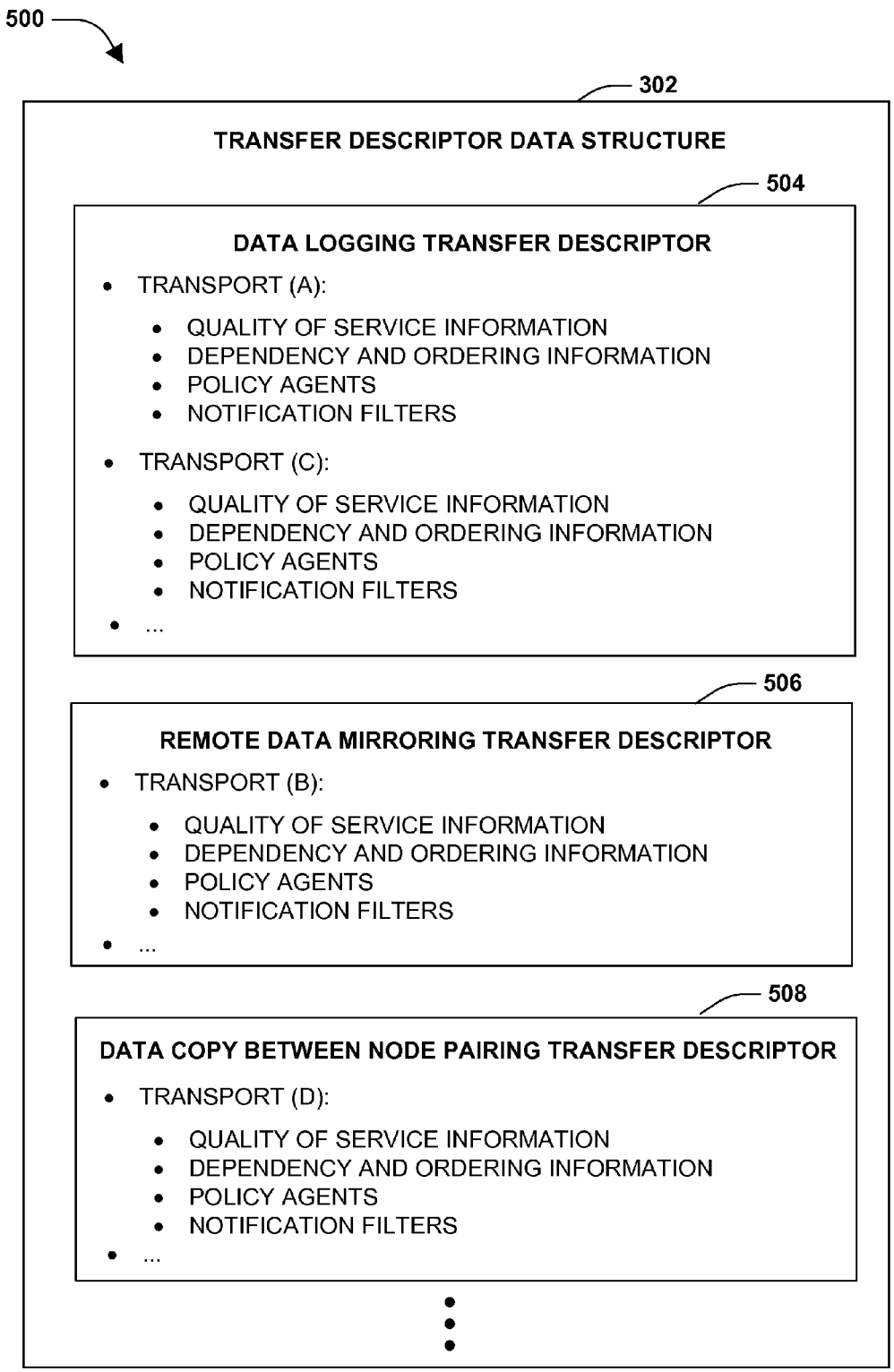
FIG. 5 is an illustration of an example of a transfer descriptor data structure.

FIG. 5 illustrates an example 500 of the transfer descriptor data structure 302. The transfer descriptor data structure 302 may comprise one or more transfer descriptors comprising data copy operational logic for transports (e.g., models and/or algorithms for performing data storage operations over various types of transports such as TCP, IP, locally attached storage, inter-cluster communication, cluster to cluster communication, etc.). A transfer descriptor may comprise quality of service information, dependency and ordering information (e.g., a first data copy operation may need to be completed before a second data copy operation), policy agents (e.g., an instruction for a policy agent to notify an application of a fault), notification filters (e.g., an instruction for the policy agent to notify the application of faults but not successful data copy operations that are instead to be provided to a second application). For example, a data logging transfer descriptor 504 may describe how to transfer logged data over a transport (A) (e.g., between locally attached storage device) and/or how to transfer logged data over a transport (B) (e.g., from a first cluster to a second cluster). A remote data mirroring transfer descriptor 506 may describe how to mirror data between two storage devices using a transport (C) (e.g., from a first NVRAM device to a second NVRAM device). A data copy between node pairing transfer descriptor 508 may describe how to copy data between two storage nodes that are configured according to a high availability node pairing over a transport (D) (e.g., from a primary NVRAM of a primary storage node to a secondary NVRAM of a secondary storage node).

Figure 6:
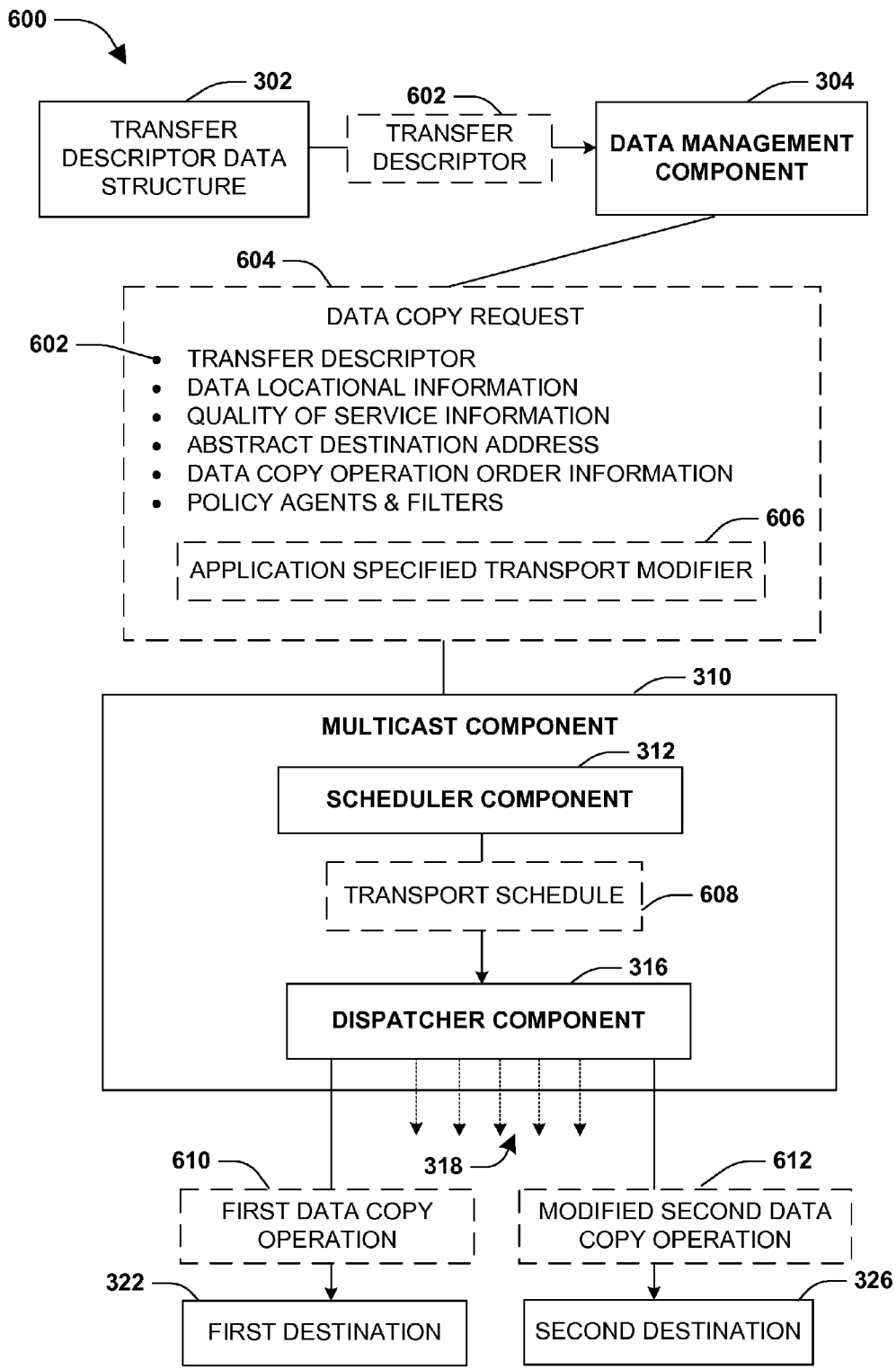
FIG. 6 is a component block diagram illustrating an exemplary system for multicast transport configuration.

FIG. 6 illustrates an example of a system 600 for multicast transport configuration. The system 600 comprises the data management component 304. The data management component 304 may determine that data is to be copied to the first destination 322 and the second destination 326. The data management component 304 may evaluate the transfer descriptor data structure 302 to identify a transfer descriptor 602 comprising data copy operation logic for moving the data to the first destination 322 using a first transport and for moving the data to the second destination 326 using a second transport. The data management component 304 may create an application specified transport modifier 606 defining a modification for an implementation of the data copy operation logic. For example, the application specified transport modifier 606 may specify a quality of service emulation to apply to a second data copy operation 612 that is to be performed over the second transport to the second description 326 (e.g., implementation of a security quality of service metric not natively supported by the second transport).

The data management component 304 may generate a data copy request 604 comprising the transfer descriptor 602, the application specified transport modifier 606, and/or other information such as data locational information (e.g., where to locate the data that is to be copied), quality of service information for the transports, an abstract destination address for the first destination 322 and the second destination 326 (e.g., a single address that may be translated for the first destination 322 and translated for the second destination 326), data copy operation order information (e.g., the second data copy operation 612 is to be completed before the first data copy operation 610 or that parallel execution is allowed), policy agents and filters (e.g., an instruction for a policy agent to notify a notification target of a status of the first data copy operation 610), etc. The data copy request 604 may be sent to the multicast component 310, such as to the scheduler component 312. The scheduler component 312 may create a transport schedule 608 for the first data copy operation 610 and the second data copy operation 612. The dispatcher component 316 may implement the transport schedule 608 by facilitating the data copy operations over one or more transports 318. The dispatcher component 316 may apply the application specified transport modifier 606 to the second data copy operation 612 for facilitation over the second transport to the second destination 326.

Figure 7:
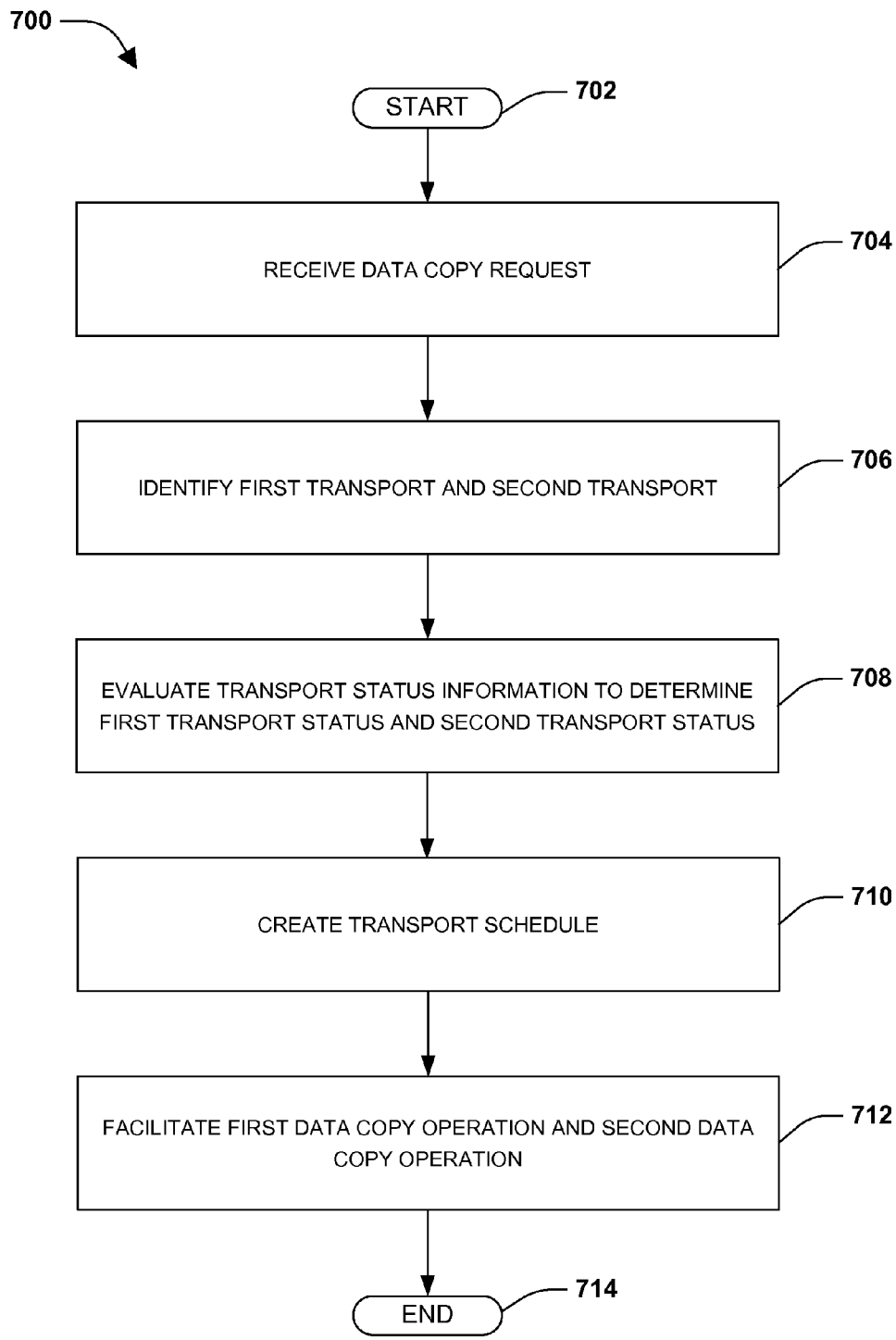
FIG. 7 is a flow chart illustrating an exemplary method of multicast transport.

One embodiment of multicast transport is illustrated by an exemplary method 700 of FIG. 7. At 702, the method starts. At 704, a data copy request may be received from an application to copy data to a first destination and to a second destination. It may be appreciated that the data copy request may correspond to any number of destinations such as a single destination or a plurality of destinations, and that merely the first destination and the second destination are discussed for illustrative purposes. The data copy request may comprise a transfer descriptor comprising data copy operation logic for moving data, data locational information identify locations from which to retrieve the data that is to be copied, destination address information (e.g., an abstract destination identifier for both the first destination and the second destination), a quality of service attribute, data copy operation order information (e.g., indicating that the data may be copied in parallel to the first destination and the second destination), and/or other information such as an application specified transport modifier used to modify the data copy operation logic. At 706, a first transport over which first data of the data copy request can be transported to the first destination may be identified. A second transport, different than the first transport, over which second data (e.g., the same or different data than the first data) of the data copy request can be transported to the second destination may be identified. In an example, the transfer descriptor of the data copy request may be evaluated to identify first transport characteristics of the first transport and second transport characteristics of the second transport.

At 708, transport status information may be evaluated to determine a first transport status of the first transport and a second transport status of the second transport. The transport status information may specify a transport path data rate of a transport, a transport path availability of the transport, a transport path topology, a transport path performance of the transport, etc. At 710, a transport schedule for a first data copy operation associated with the first data and a second data copy operation associated with the second data may be created based upon the first transport status and/or the second transport status. It may be appreciated that a plurality of data copy operations may be scheduled within the transport schedule and that merely the first data copy operation and the second data copy operation are discussed for simplicity. The transport schedule may comprise a list of transport entries. A transport entry, associated with a first transport, may comprise a first transport identifier of the first transport, first quality of service information for the first transport, first destination address information for the first destination, and/or first data location information of the first data that is to be copied by the first transport.

In an example, a data copy operation order may be defined within the transport schedule. The data copy operation may specify an order with which to perform the first data copy operation, the second data copy operation, and/or other data copy operations scheduled within the transport schedule (e.g., parallel execution, serial execution based upon a data copy operation dependency, etc.).

In an example where the first transport status indicates that the first transport is unavailable (e.g., inoperable due to one or more data copy operation faults over the first transport), a third transport over which the first data of the data copy request can be transported to the first destination may be identified. The transport schedule may specify that the third transport is to be used to facilitate the first data copy operation to the first destination.

At 712, the first data copy operation may be facilitated over the first transport based upon the first transport characteristics of the first transport and the transport schedule. The second data copy operation may be facilitated over the second transport based upon the second transport characteristics of the second transport and the transport schedule. In an example, the data copy request may have comprised an abstract destination identifier for both the first destination and the second destination. A first interpreted address may be generated for the first destination based upon the abstract destination identifier. The first interpreted address may be included within the first data copy operation. A second interpreted address may be generated for the second destination based upon the abstract destination identifier. The second interpreted address may be included within the second data copy operation.

In an example, operation result information associated with the first data copy operation and/or the second data copy operation may be generated (e.g., a fault may have occurred, a delay may have occurred, latency metrics, bandwidth metrics, data may have been successfully copied, etc.). The operation result information may be provided to a policy agent for processing based upon a primitive notification instruction (e.g., an instruction to notify an application if a fault occurs for the second data copy operation). In an example, a set of operation result information, indicating transport status information for an aggregate of data copy operations associated with a transport such as the first transport, may be generated. The set of operation result information may be provided to the policy agent for processing based upon an aggregate notification instruction (e.g., an instruction to notify an administrator application if more than 5 faults occur within a threshold timespan for the first transport).

In an example, a new transport may become accessible. The new transport may provide a new transport path to one or more destinations (e.g., access to a mobile storage device). A new transport entry, for the new transport, may be created in the transport status information so that the scheduler component 312 may utilize the new transport entry when scheduling data copy operations. The transfer descriptor data structure 302 may be updated based upon the new transport. The transfer descriptor data structure 302 may be exposed to the application for data copy request creation. At 714, the method ends.

Figure 8A:
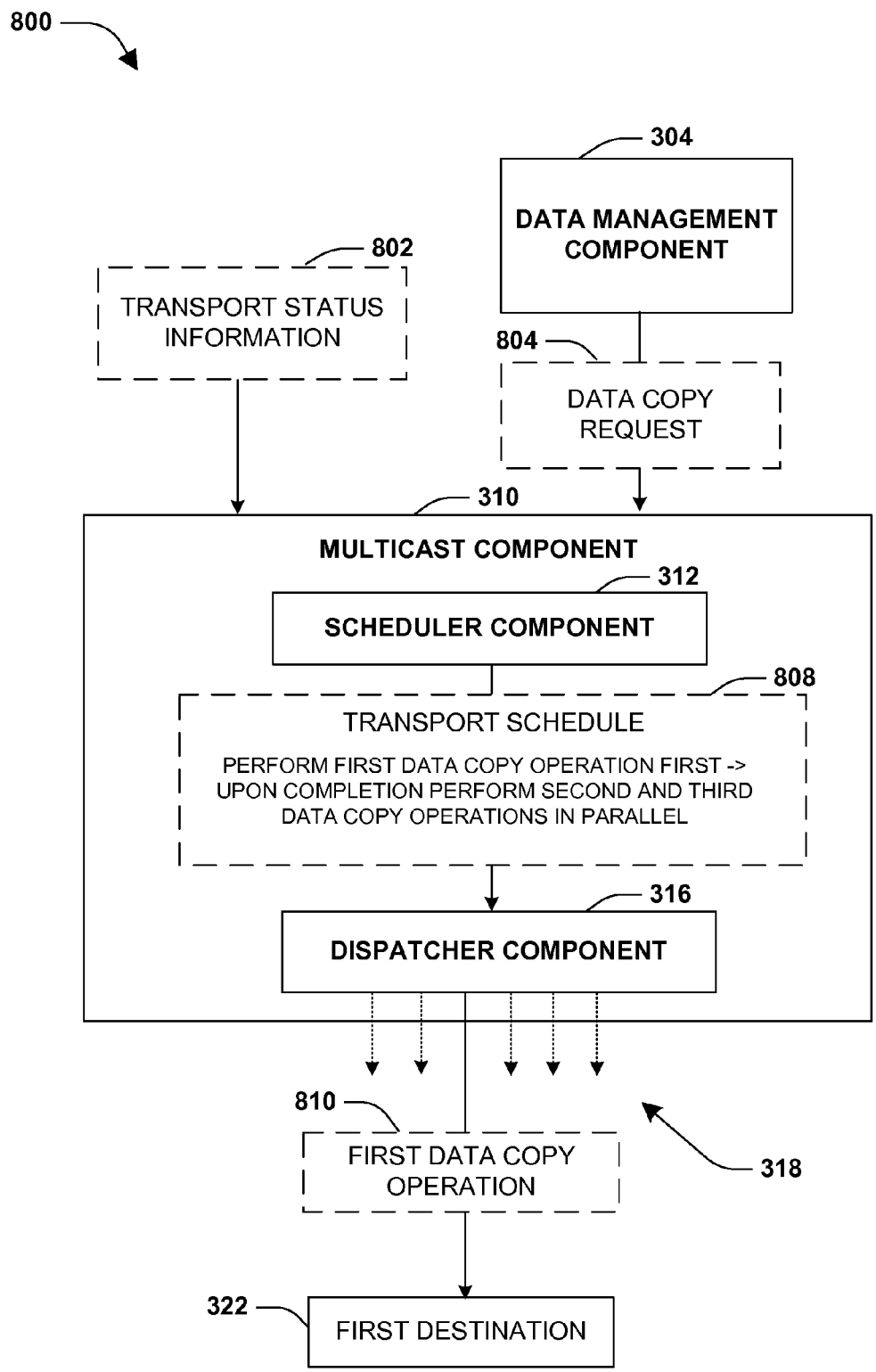
FIG. 8A is a component block diagram illustrating an exemplary system for multicast transport configuration, where a first data copy operation is facilitated.
Figure 8B:
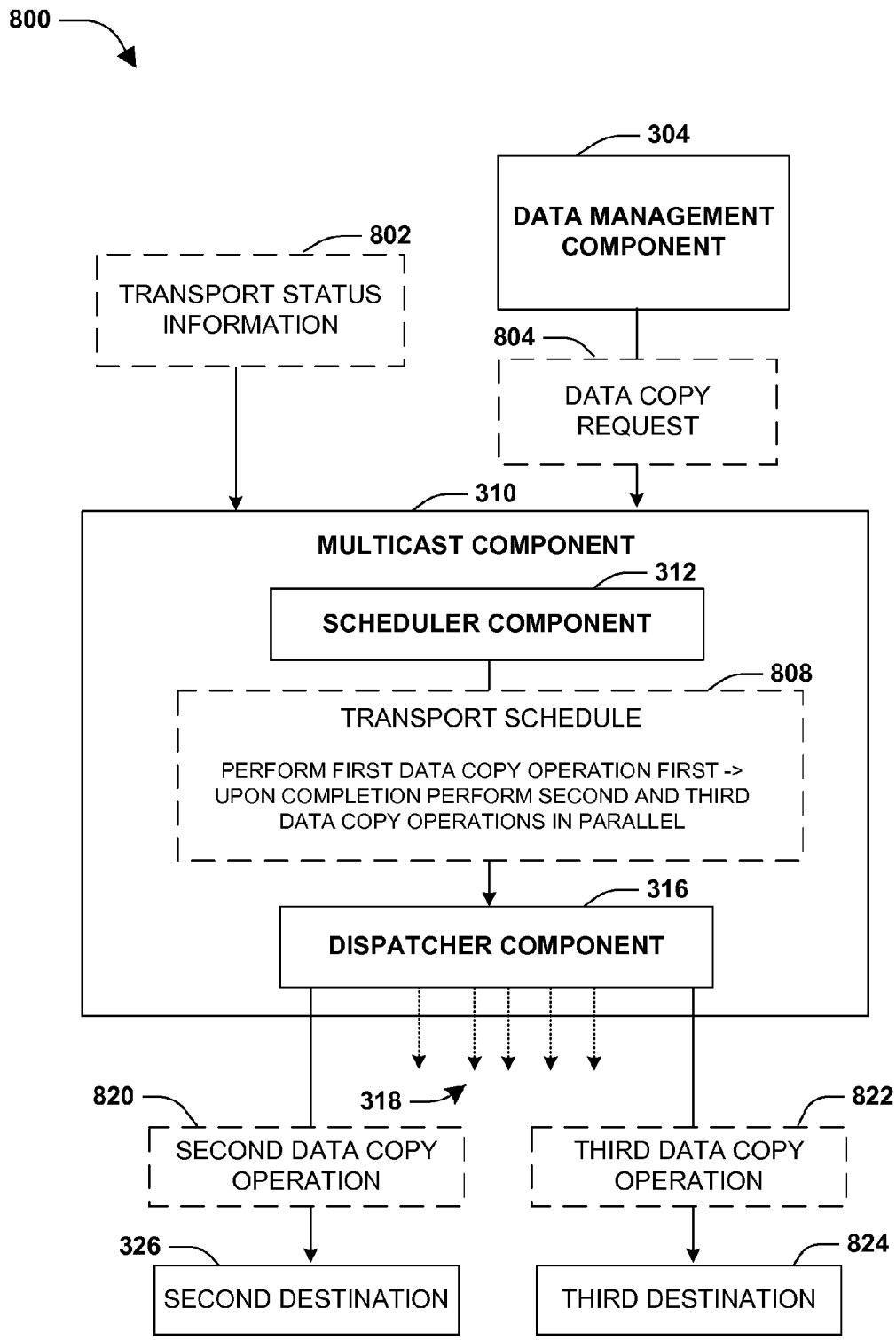
FIG. 8B is a component block diagram illustrating an exemplary system for multicast transport configuration, where a second data copy operation and a third data copy operation are facilitated in parallel.

FIGS. 8A and 8B illustrate examples of a system 800, comprising the multicast component 310 that comprises the scheduler component 312 and/or the dispatcher component 316, for multicast transport. FIG. 8A illustrates the multicast component 310 facilitating a first data copy operation 810. For example, the scheduler component 312 may receive a data copy request 804 from the data management component 304. The data copy request 804 may indicate that data is to be copied to first destination 322, a second destination 326, and a third destination 824. The data copy request 804 may specify a data copy operation dependency such that the first data copy operation 810 is to be performed first, and then upon completion of the first data copy operation 810, a second data copy operation 820 to the second destination 326 and a third data copy operation 822 to the third destination 824 may be performed in parallel.

The scheduler component 312 may identify a first transport over which the first data copy operation 810 may be performed, a second transport over which the second data copy operation 820 may be performed, and a third transport over which the third data copy operation 822 may be performed. The scheduler component 312 may evaluate transport status information 802 (e.g., from the transfer descriptor data structure 302) to determine a first transport status for the first transport, a second transport status for the second transport, and a third transport status for the third transport. The scheduler component 808 may create a transport schedule 808 based upon the data copy request 804 (e.g., based upon the data copy operation dependency) and/or the transport status information 802.

The dispatcher component 316 may facilitate the first data copy operation 810 over the first transport to the first destination 322 based upon the transport schedule 808 specifying that the first data copy operation 810 is to be performed first. FIG. 8B illustrates the dispatcher component 316 facilitating the second data copy operation 820 and the third data copy operation 822 in parallel based upon the transport schedule 808 indicating that parallel execution of the second data copy operation 820 and the third data copy operation 822 is allowed. In this way, multiple data copy operations may be performed over heterogeneous transports to multiple destinations based upon the single data copy request 804 without the data management component 304 having knowledge of such transports and/or without the destinations having knowledge of the multicast transport of multiple data copy operations.

Figure 9:
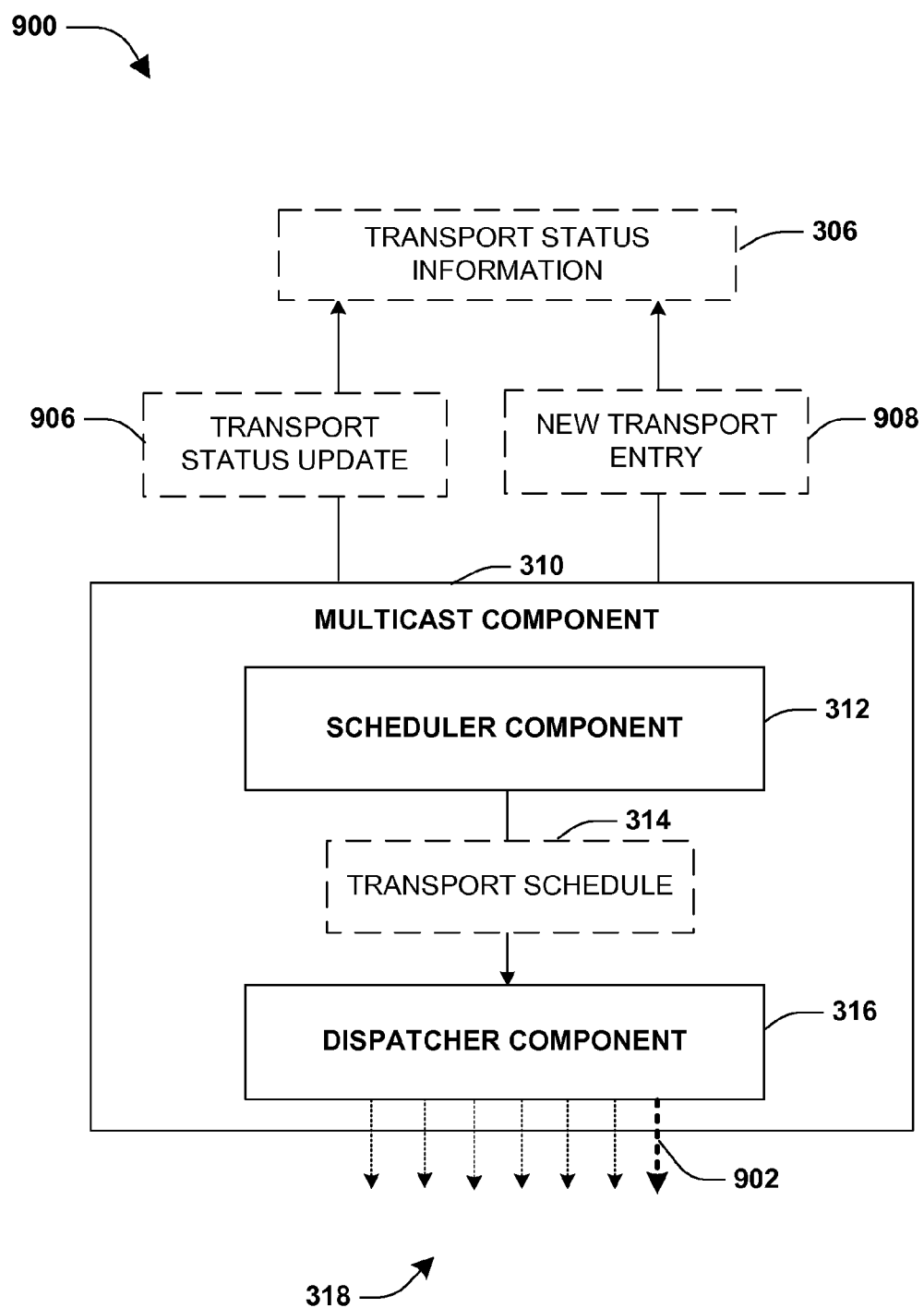
FIG. 9 is a component block diagram illustrating an exemplary system for multicast transport configuration, where a new transport entry may be generated and added to the transport status information.

FIG. 9 illustrates an exemplary system 900 where a new transport entry 908 may be generated and added to the transport status information 306. The new transport entry 908 may provide a new transport path to one or more destinations. The new transport entry 908 may be added to the transport status information 306 so that the scheduler component 312 may utilize the new transport entry 908 when scheduling data copy operations. Transport status updates 906 may also be applied to the transport status information 306 when the capabilities or availability of some transport has changed (e.g. a change to the expected latency, bandwidth, resilience, or resilience) so that the updated transport status information 306 may be used by the scheduler component 312 for data copy request processing.

Figure 10:
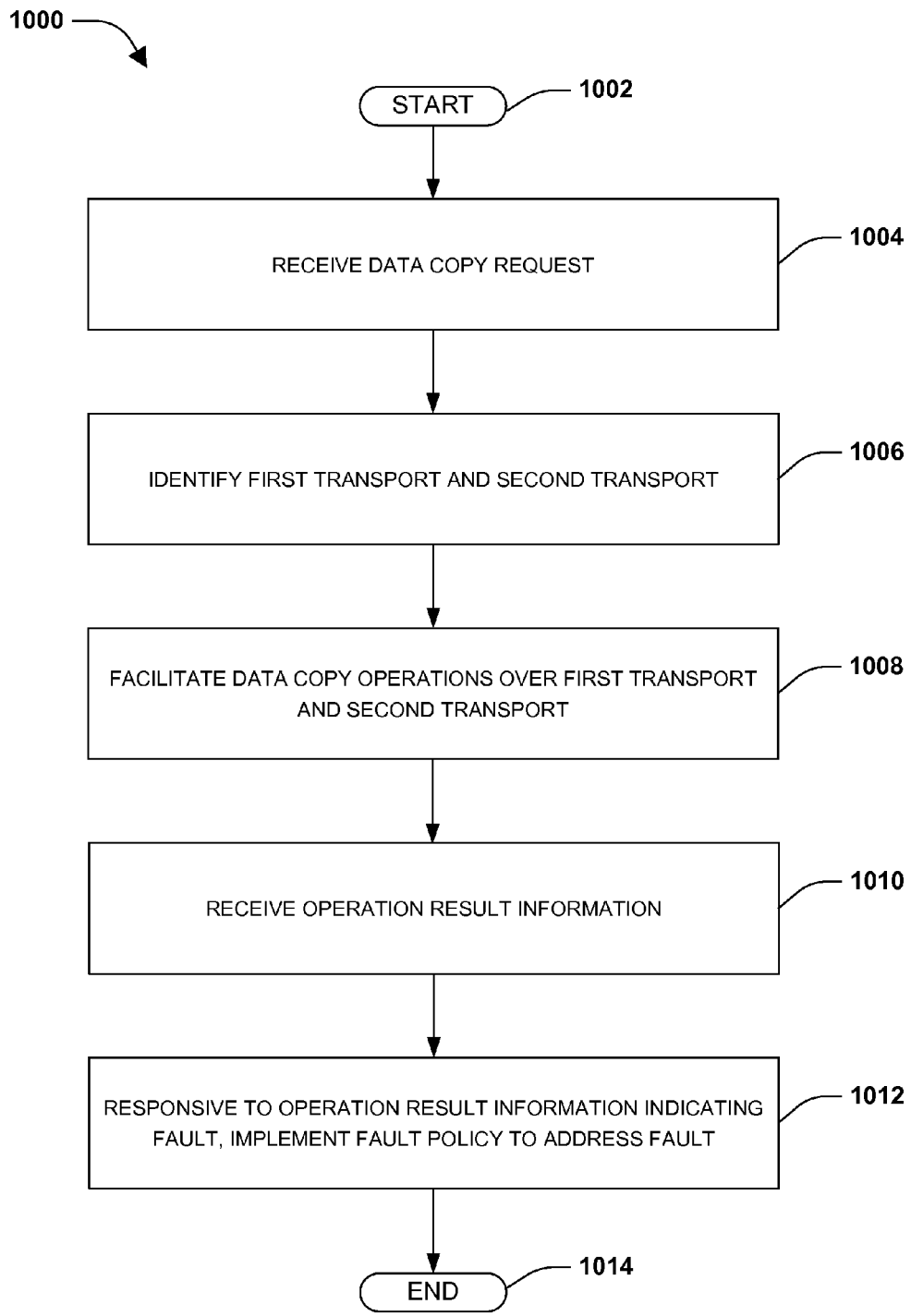
FIG. 10 is a flow chart illustrating an exemplary method of fault policy implementation.

One embodiment of fault policy implementation is illustrated by an exemplary method 1000 of FIG. 10. At 1002, the method starts. At 1004, a data copy request may be received from an application to copy data to a first destination and to a second destination. It may be appreciated that the data copy request may correspond to a plurality of destinations and that merely the first destination and the second destination are discussed for simplicity. The data copy request may comprise a transfer descriptor comprising data copy operation logic for moving data, data locational information used to identify locations of the data to be copied, destination address information (e.g., an abstract destination identifier for both the first destination and the second destination), a quality of service attribute, data copy operation order information (e.g., an indicating that the data may be copied in parallel to the first destination and the second destination), and/or other information such as an application specified transport modifier used to modify the data copy operation logic. At 1006, a first transport over which first data of the data copy request can be transported to the first destination may be identified. A second transport, different than the first transport, over which second data (e.g., the same or different data than the first data) of the data copy request can be transported to the second destination may be identified. In an example, the transfer descriptor of the data copy request may be evaluated to identify first transport characteristics of the first transport and second transport characteristics of the second transport.

At 1008, the first data copy operation may be facilitated over the first transport based upon the first transport characteristics of the first transport and the second data copy operation may be facilitated over the second transport based upon the second transport characteristics of the second transport. In an example, the first data copy operation, the second data copy operation, and/or other data copy operations may be facilitated according to a data copy operation order specifying an order with which to perform the data copy operations. In an example, transport characteristics of a transport may be evaluated to determine a threshold safety criteria, such as an expected response time to receive a completion notification regarding the first data copy operation of the first data over the first transport. The threshold safety criteria may be determined based upon a location of the first destination (e.g., locally attached storage may be expected to provide a data copy operation result quicker than a remote cluster network located thousands of miles away), a data transfer rate of the first transport, a threshold response time of the first transport and/or the first destination, and/or other characteristics of the first transport and/or the first destination. Responsive to the first data copy operation not being complete and the threshold safety criteria being satisfied by the first data copy operation (e.g., an elapsed execution of the first data copy operation may be less than the expected response time), a data safety message, indicating that the first data is safe, may be provided to the application.

At 1010, operation result information, associated with the first data copy operation and/or the second data copy operation, may be received. The operation result information may indicate whether a fault occurred with a data copy operation (e.g., a timeout without a completion response from a destination due to a failure of a transport or the destination), a successful completion of the data copy operation, statistics of the data copy operation (e.g., latency, completion time, etc.), and/or other information relating to the data copy operation, the transport, and/or the destination. In an example, responsive to the operation result information indicating a fault, a fault policy may be implemented to address the fault. For example, the fault may indicate that the first transport is unavailable. In an example, the fault policy may specify that the first transport is to be retried after a threshold timespan. A retry timer may be specified for the first transport (e.g., set to an expected restoration threshold timespan at which the first transport may become available). Responsive to expiration of the retry timer, a retry data copy operation may be facilitated over the first transport. In another example, the fault policy may indicate that a different transport is to be attempted, such as a different transport path connected to the first destination. For example, the first destination may be determined as supporting the second transport (e.g., a second transport path may be connected to the first destination). A retry data copy operation may be performed over the second transport based upon the second transport characteristics of the second transport.

In an example, a fault notification of the fault may be provided to the application and/or any other notification target specified by the data copy request. In an example where the operation result information indicates a successful completion of the first data copy operation, a success notification may be provided to the application and/or any other notification target specified by the data copy request. In an example, the data copy operation order of the data copy operation may be updated based upon faults and/or successful completions of data copy operations (e.g., a third data copy operation that was dependent upon the first data copy operation may be delayed or reordered based upon an unsuccessful completion of the first data copy operation).

In an example, a primitive notification instruction may be maintained for the first data copy operation. Responsive to the operation result information indicating a status (e.g., success, failure, high latency, etc.) for the first data copy operation, the primitive notification instruction may be evaluated to identify a notification target and a filter criteria (e.g., a low latency status is to be reported for the first data copy operation to an administrator application). Responsive to the status satisfying the filter criteria, a notification of the status may be provided to the notification target. In an example, the notification target may comprise the multicast component 310 that may be configured to specify a lockout delay (e.g., the first transport may be specified as unavailable for 20 seconds) or a restricted use for the first transport (e.g., a bandwidth of data copy operation data for the first transport may be limited due to the high latency) based upon the status.

In an example, an aggregate notification instruction for an aggregate of data copy operations associated with the first transport may be maintained. Responsive to receiving a set of operation result information indicating transport status information for the aggregate of data copy operations (e.g., the transport status information may indicate that the first transport has failed, has been upgraded to a faster speed, has been remove, has been replaced, has had a software update, etc.), the aggregate notification structure may be evaluated to identify a notification target and a filter criteria (e.g., the multicast component 310 is to be notified of a removal of the first transport). Responsive to the transport status information satisfying the filter criteria, a notification of the transport status information may be provided to the notification target (e.g., the multicast component 310 may update the transfer descriptor data structure 302 and/or the transport status information 306 to remove the first transport).

In an example, a set of incomplete data copy operation may be identified. For example, the first data copy operation may have completed, but the second data copy operation, a third data copy operation, and a fourth data copy operation may have not yet completed. A replan for the set of incomplete data copy operations may be constructed based upon the operation result information (e.g., the fourth data copy operation may be rescheduled to be facilitated before the third data copy operation). The replan may comprise an ordering with which to facilitate incomplete data copy operations, a dynamic constraint update for a dynamic constraint associated with facilitating an incomplete data copy operation over a transport (e.g., a change to a quality of service for the second transport), a reassignment of an incomplete data copy operation to a reassigned transport (e.g., the fourth data copy operation may be reassigned from a fourth transport to a third transport). In this way, various fault policies may be implemented for multicast transport. At 1014, the method ends.

Figure 11A:
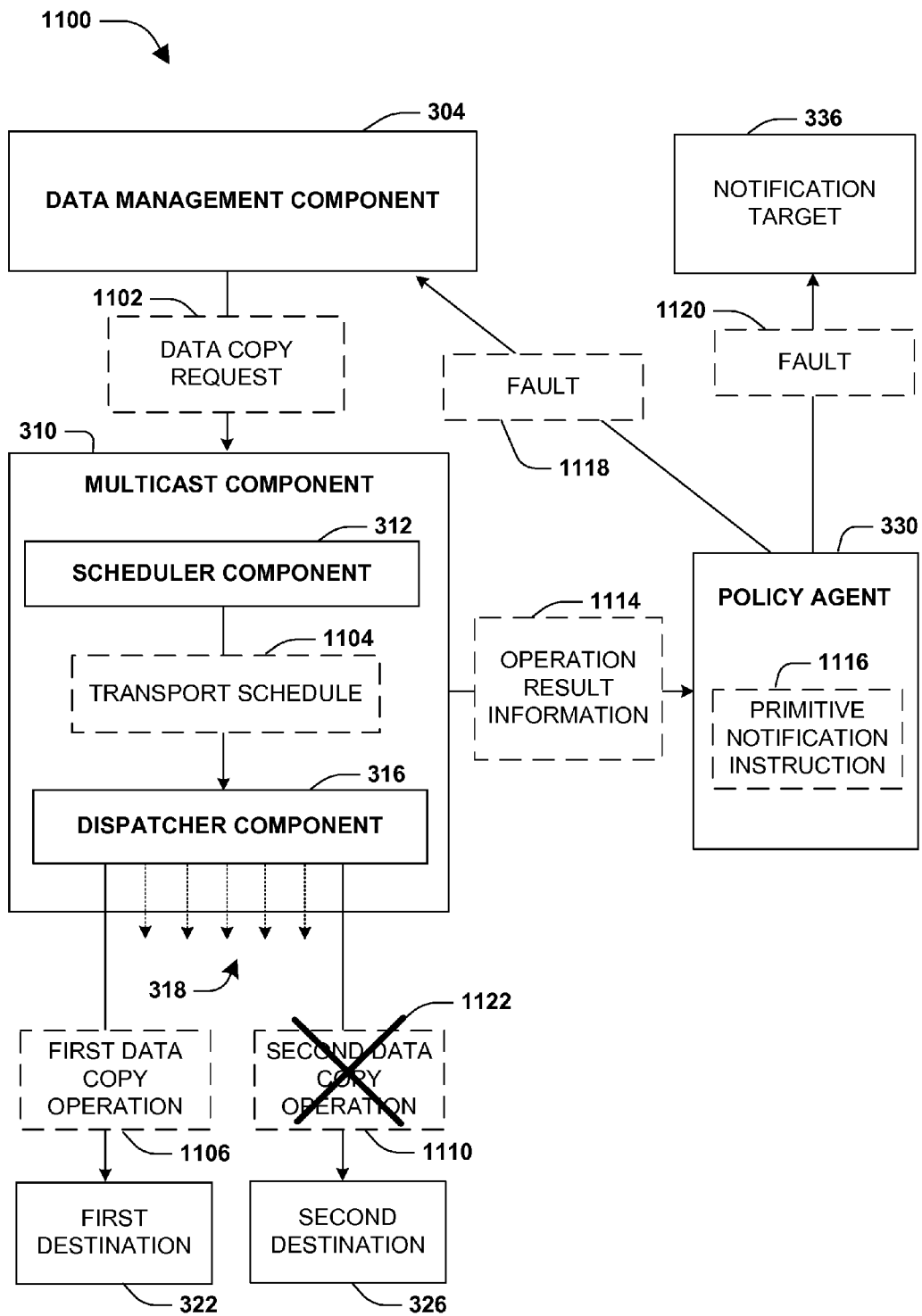
FIG. 11A is a component block diagram illustrating an exemplary system for fault policy implementation, where fault notifications are provided to fault notification targets.

FIGS. 11A-11E illustrate examples of a system 1100, comprising the policy agent 330, for fault policy implementation. FIG. 11A illustrates a multicast component 310 receiving a data copy request 1102 to copy data to the first destination 332, the second destination 326, the third destination 824, a fourth destination 1152, and/or other destinations not illustrated. A scheduler component 312 may create a transport schedule 1104 specifying that a first data copy operation 1106 over a first transport to the first destination 322 can be performed in parallel with a second data copy operation 1110 over a second transport to the second destination 326. The transport schedule 1104 may specify that a third data copy operation 1150 is to be performed over a third transport to the third destination 824 after completion of the second data copy operation 1110 based upon a dependency of the third data copy operation 1150 on the second data copy operation 1110.

The dispatcher component 316 may facilitate the first data copy operation 1106 and the second data copy operation 1110 based upon the transport schedule 1104. Operation result information 1114 may be generated based upon the status of the first data copy operation 1106 and the second data copy operation 1110. For example, the operation result information 1114 may indicate that the first data copy operation 1106 completed successfully and that a fault 1122 (e.g., a timeout) occurred for the second data copy operation 1110.

The policy agent 330 may receive the operation result information 1114. The policy agent 330 may process the operation result information 1114 based upon a primitive notification instruction 1116. For example, the policy agent 330 may send a first fault notification 1118 to the data management component 304 and a second fault notification 1120 to the notification target 336 based upon the primitive notification instruction 1116 indicating that faults of the second data copy operation 1110 are to be sent to the data management component 304 and the notification target 336.

Figure 11B:
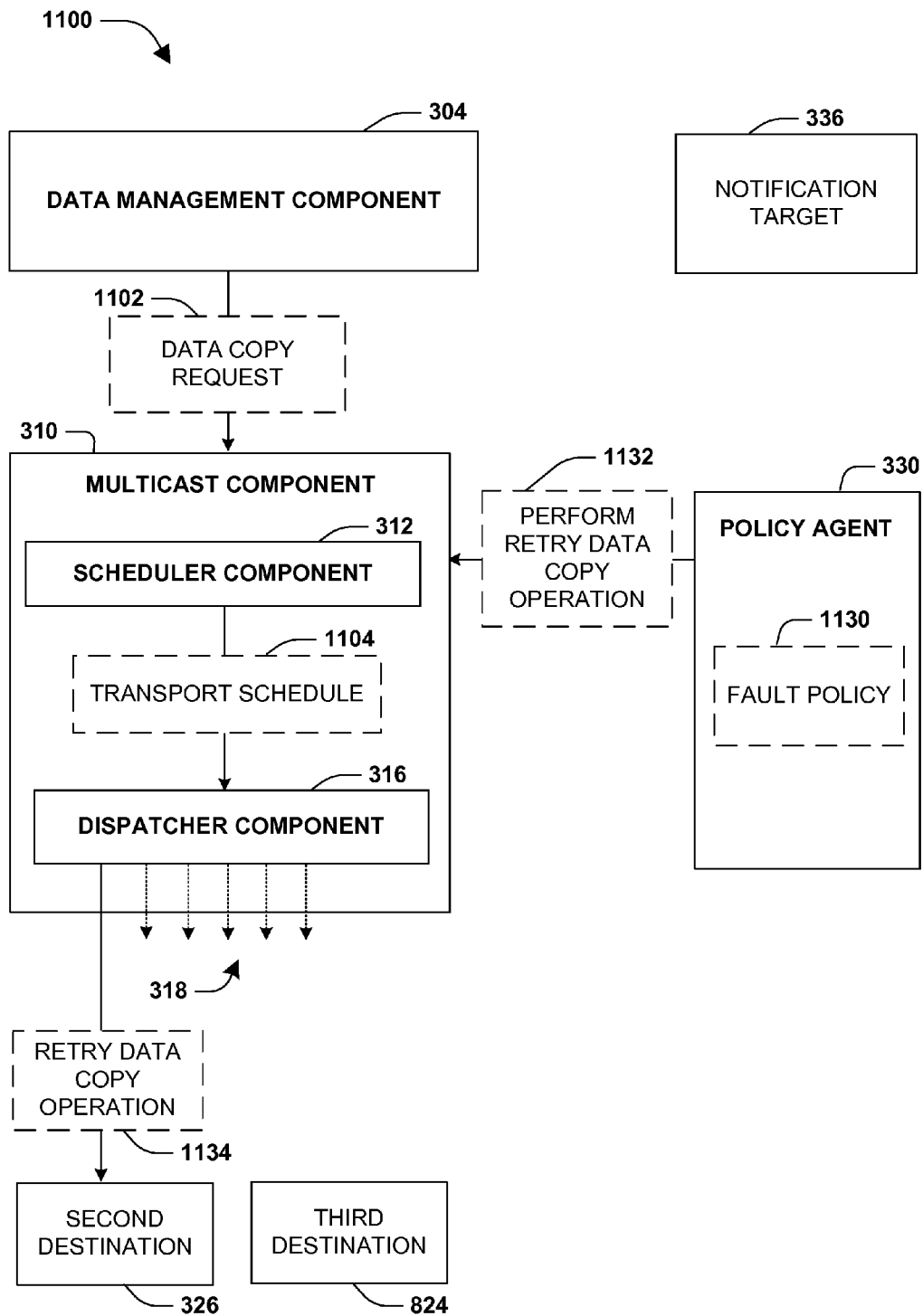
FIG. 11B is a component block diagram illustrating an exemplary system for fault policy implementation, where a retry data copy operation is performed.

FIG. 11B illustrates the dispatcher component 316 performing a retry data copy operation 1134 for the second data copy operation 1110. Because the fault 1122 of the second data copy operation 1110 may have resulted in an unsuccessful completion of the second data copy operation 1110, the dispatcher component 316 may refrain from facilitating the third data copy operation 1150 until completion of the second data copy operation 1110 or a retry thereof because the transport schedule 1104 specifies that the third data copy operation 1150 is dependent upon completion of the second data copy operation 1110. In an example, the policy agent 330 may maintain a fault policy 1130 specifying that a retry over the second transport is to be performed when the fault 1122 occurs for the second data copy operation 1110 over the second transport. The policy agent 330 may send a perform retry data copy operation instruction 1132 to the multicast component 310. The dispatcher component 316 may facilitate the retry data copy operation 1134 over the second transport to the second destination 326 based upon the perform retry data copy operation instruction 1132.

Figure 11C:
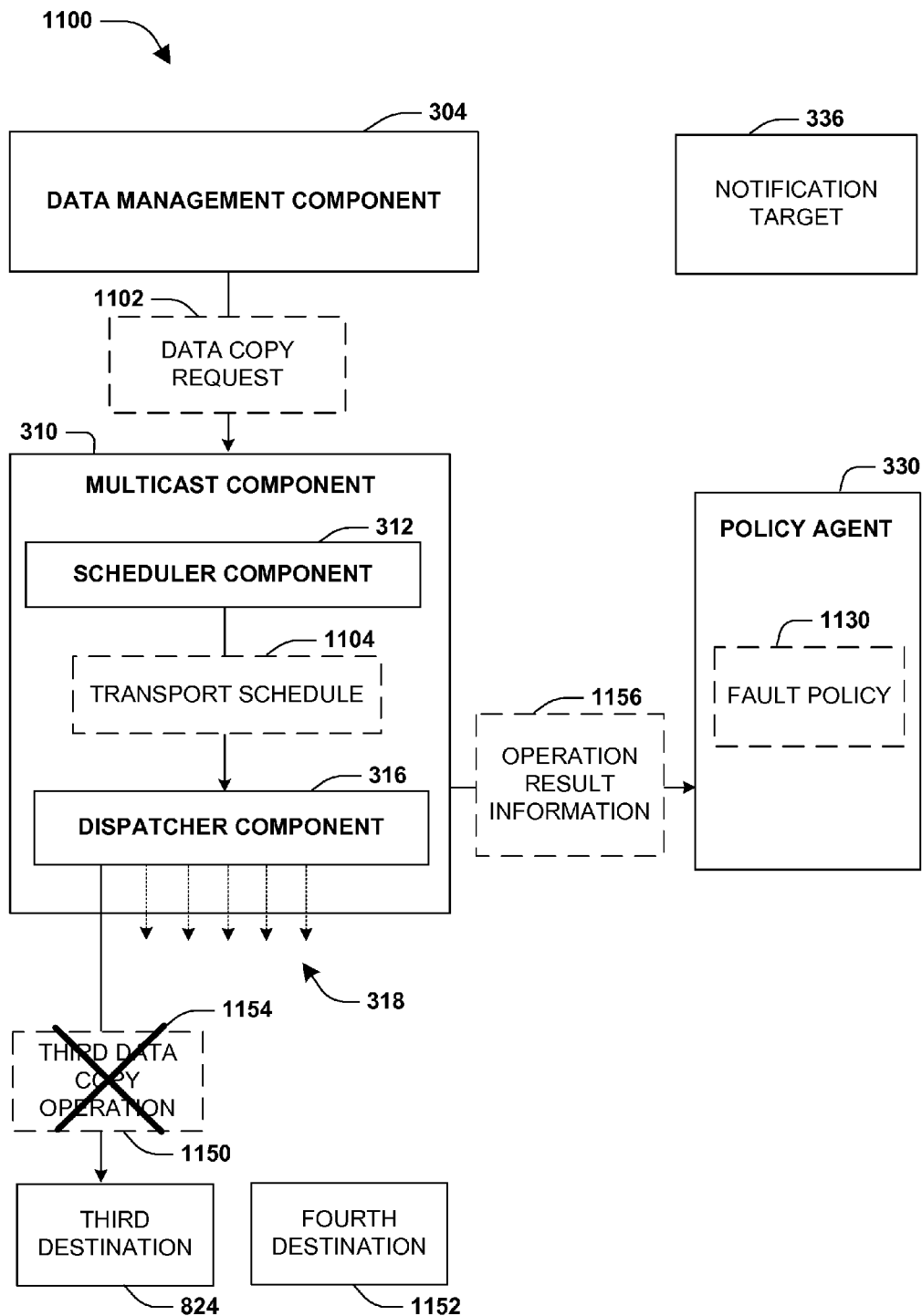
FIG. 11C is a component block diagram illustrating an exemplary system for fault policy implementation, where a fault occurs.

FIG. 11C illustrates the dispatcher component 316 attempting the third data copy operation 1150 upon successful completion of the second data copy operation 1110, such as after successful completion of the retry data copy operation 1134. Operation result information 1156 may be generated based upon a status of the third data copy operation 1150. For example, the operation result 1156 may indicate that a fault 1154 (e.g., a timeout) occurred for the third data copy operation 1150. The policy agent 330 may receive and process the operation result information 1156 based upon the fault policy 1130.

Figure 11D:
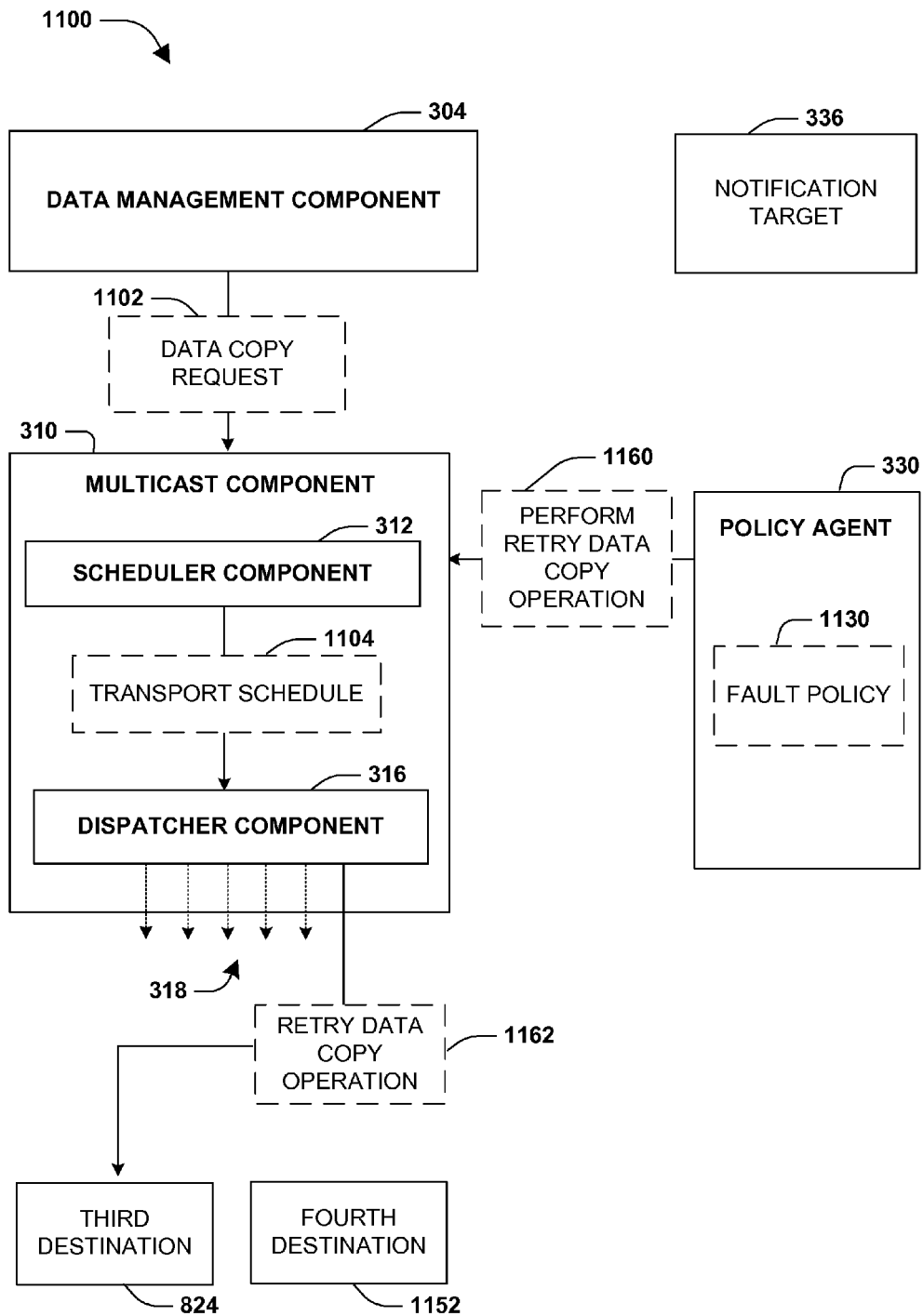
FIG. 11D is a component block diagram illustrating an exemplary system for fault policy implementation, where a retry data copy operation is performed.

FIG. 11D illustrates the dispatcher component 316 performing a retry data copy operation 1162, for the third data copy operation 1150, over a sixth transport to the third destination 824. In an example, the fault policy 1130 may specify that a retry over the six transport is to be performed when a fault, such as the fault 1154, occurs for the third data copy operation 1150 over the third transport. The policy agent 330 may send a perform retry data copy operation instruction 1160 to the multicast component 310. The dispatcher component 316 may facilitate the retry data copy operation 1162 over the sixth transport to the third destination based 824 upon the perform retry data copy operation instruction 1160.

Figure 11E:
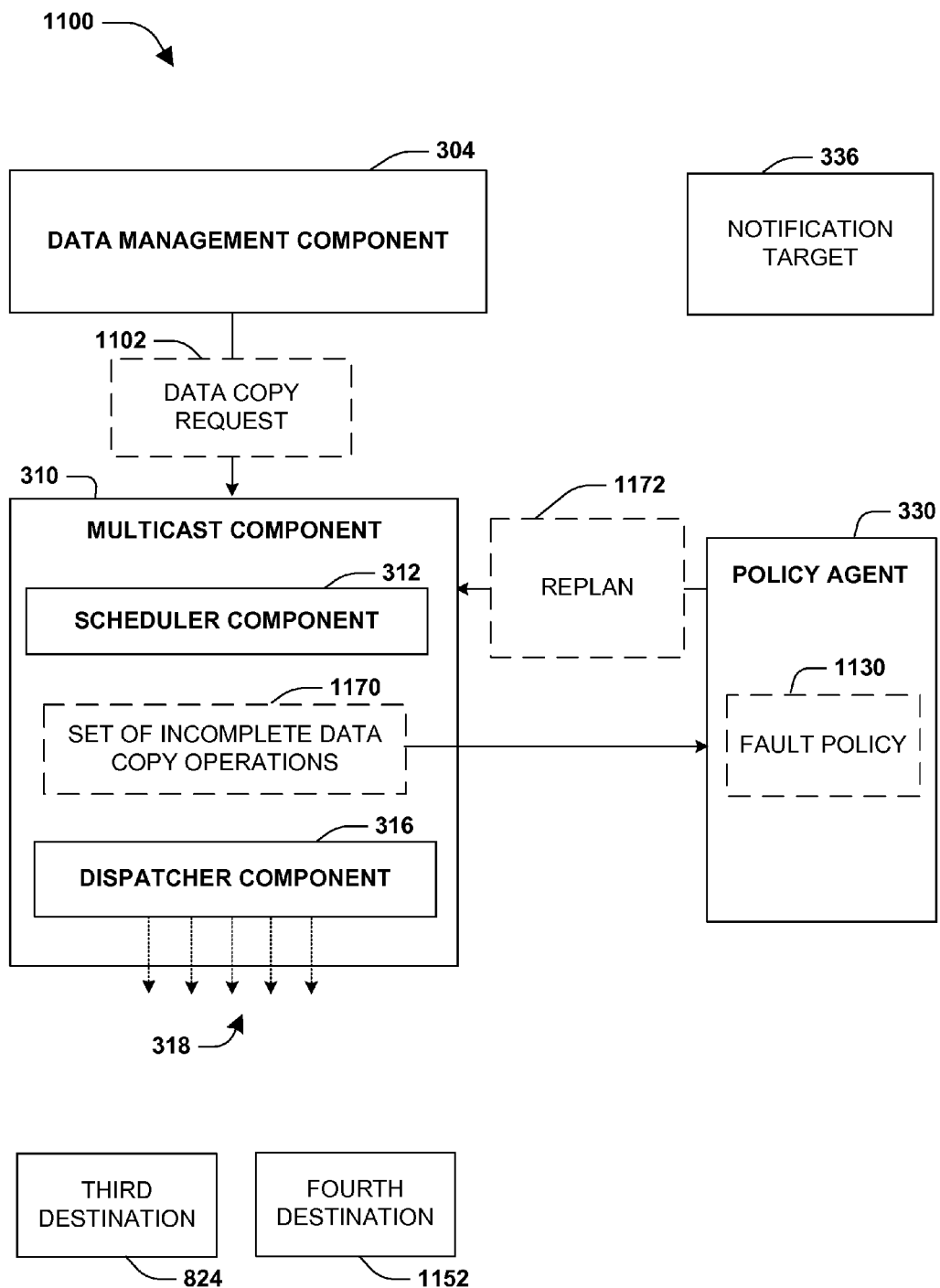
FIG. 11E is a component block diagram illustrating an exemplary system for fault policy implementation, where a replan for incomplete data copy operations is constructed.

FIG. 11E illustrates the policy agent 330 specifying a replan 1172 for a set of incomplete data copy operations 1170. For example, the policy agent 330 may determine that a fourth data copy operation, a fifth data copy operation, a sixth data copy operation, and/or other data copy operations are incomplete. The policy agent 330 may construct the replan 1172 for the set of incomplete data copy operations 1170 based upon operational result information of completed and/or previously attempted data copy operations. In an example, the replan 1172 may reorder one or more incomplete data copy operations within the transport schedule 1104. In an example, the replan 1172 may reassign an incomplete data copy operation from a currently assigned transport to a reassigned transport. In an example, the replan 1172 may update dynamic constraints, such as quality of service, for one or more incomplete data copy operations.

Figure 12:
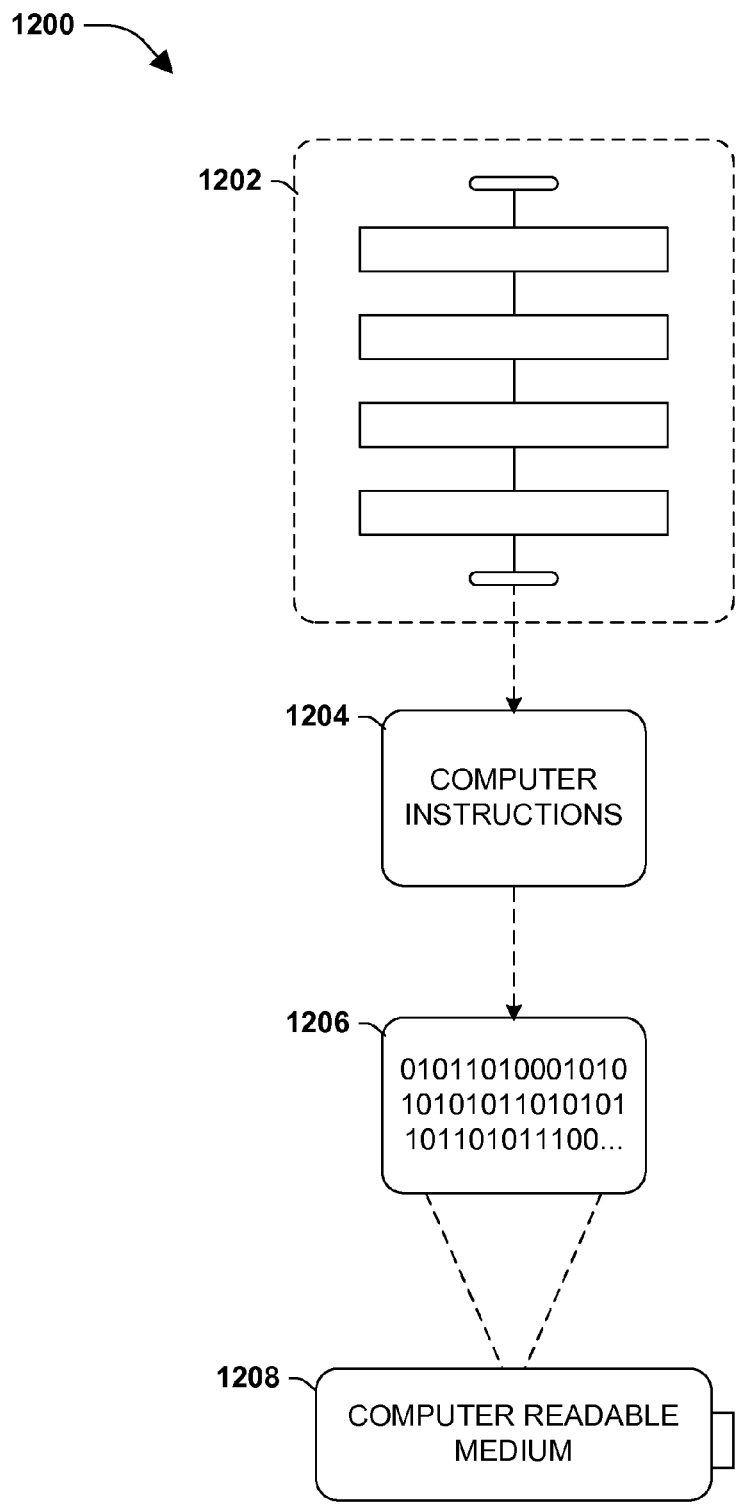
FIG. 12 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 12, wherein the implementation 1200 comprises a computer-readable medium 1208, such as a CD-R, DVD-R, flash drive, a platter of a hard disk drive, etc., on which is encoded computer-readable data 1206. This computer-readable data 1206, such as binary data comprising at least one of a zero or a one, in turn comprises a set of computer instructions 1204 configured to operate according to one or more of the principles set forth herein. In some embodiments, the processor-executable computer instructions 1204 are configured to perform a method 1202, such as at least some of the exemplary method 400 of FIG. 4, at least some of the exemplary method 700 of FIG. 7, and/or at least some of the exemplary method 1000 of FIG. 10, for example. In some embodiments, the processor-executable instructions 1204 are configured to implement a system, such as at least some of the exemplary system 300 of FIG. 3, at least some of the exemplary system 600 of FIG. 6, at least some of the exemplary system 800 of FIGS. 8A and 8B, at least some of the exemplary system 900 of FIG. 9, and/or at least some of the exemplary system 1100 of FIGS. 11A-11E, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A computing device, comprising:
a memory containing a machine readable medium comprising machine executable code having stored thereon instructions for performing a method of multicast transport; and
a processor coupled to the memory, the processor configured to execute the machine executable code to:
identify first and second transports over which data of a data copy request received from an application can be transported to first and second destinations, respectively, wherein the first and second transports are heterogenous transports associated with different protocols and the data copy request comprises an abstract destination identifier;
evaluate transport status information to determine first and second transport statuses of the first and second transports, respectively;
generate first and second interpreted addresses for the first and second destinations, respectively, based upon the abstract destination identifier;
create a transport schedule for first and second data copy operations based upon the first and second transport statuses, the first and second data copy operations including the first and second interpreted addresses, respectively; and
facilitate the first and second data copy operations over the first and second transports based upon first and second transport characteristics of the first and second transports, respectively, and the transport schedule.

2. The computing device of claim 1, wherein the processor is further configured to execute the machine executable code to define a data copy operation order within the transport schedule, the data copy operation order specifying one or more of an order with which to perform the first data copy operation and the second data copy operation, when parallel execution of the first data copy operation and the second data copy operation is allowed, or when first data copy operation is to be performed serially before the second data copy operation.

3. The computing device of claim 1, wherein the processor is further configured to execute the machine executable code to:
evaluate the first transport status to determine that the first transport is unavailable;
identify a third transport over which the first data of the data copy request can be transported to the first destination; and
specify within the transport schedule that the first data copy operation is to be facilitated over the third transport to the first destination.

4. The computing device of claim 1, wherein the processor is further configured to execute the machine executable code to:
identify a new transport accessible to the multicast component;
create a new transport entry, for the new transport, in the transport status information to create updated transport status information; and
expose the updated transport status information to the application for data copy request creation.

5. A method, comprising:
identifying, by a computing device, first and second transports over which data of a data copy request received from an application can be transported to first and second destinations, respectively, wherein the first and second transports are heterogenous transports associated with different protocols and the data copy request comprises an abstract destination identifier;
evaluating, by the computing device, transport status information to determine first and second transport statuses of the first and second transports, respectively;

generating, by the computing device, first and second interpreted addresses for the first and second destinations, respectively, based upon the abstract destination identifier;

creating, by the computing device, a transport schedule for first and second data copy operations based upon the first and second transport statuses, the first and second data copy operations including the first and second interpreted addresses, respectively; and facilitating, by the computing device, the first and second data copy operations over the first and second transports based upon first and second transport characteristics of the first and second transports, respectively, and the transport schedule.

6. The method of claim 5, further comprising defining, by the computing device, a data copy operation order within the transport schedule, the data copy operation order specifying one or more of an order with which to perform the first data copy operation and the second data copy operation, when parallel execution of the first data copy operation and the second data copy operation is allowed, or when first data copy operation is to be performed serially before the second data copy operation.

7. The method of claim 5, further comprising:

evaluating, by the computing device, the first transport status to determine that the first transport is unavailable;

identifying, by the computing device, a third transport over which the first data of the data copy request can be transported to the first destination; and specifying, by the computing device, within the transport schedule that the first data copy operation is to be facilitated over the third transport to the first destination.

8. The method of claim 5, further comprising:

identifying, by the computing device, a new transport accessible to the multicast component;

creating, by the computing device, a new transport entry, for the new transport, in the transport status information to create updated transport status information; and exposing, by the computing device, the updated transport status information to the application for data copy request creation.

9. A non-transitory machine readable medium having stored thereon instructions for multicast transport comprising machine executable code which when executed by at least one machine causes the machine to:

identify first and second transports over which data of a data copy request received from an application can be transported to first and second destinations, respectively, wherein the first and second transports are heterogenous transports associated with different protocols and the data copy request comprises an abstract destination identifier;

evaluate transport status information to determine first and second transport statuses of the first and second transports, respectively;

generate first and second interpreted addresses for the first and second destinations, respectively, based upon the abstract destination identifier;

create a transport schedule for first and second data copy operations based upon the first and second transport statuses, the first and second data copy operations including the first and second interpreted addresses, respectively; and facilitate the first and second data copy operations over the first and second transports based upon first and second transport characteristics of the first and second transports, respectively, and the transport schedule.

10. The non-transitory machine readable medium of claim 9, wherein the machine executable code when executed by the at least one machine further causes the machine to define a data copy operation order within the transport schedule, the data copy operation order specifying one or more of an order with which to perform the first data copy operation and the second data copy operation, when parallel execution of the first data copy operation and the second data copy operation is allowed, or when first data copy operation is to be performed serially before the second data copy operation.

11. The non-transitory machine readable medium of claim 9, wherein the machine executable code when executed by the at least one machine further causes the machine to:

evaluate the first transport status to determine that the first transport is unavailable;

identify a third transport over which the first data of the data copy request can be transported to the first destination; and specify within the transport schedule that the first data copy operation is to be facilitated over the third transport to the first destination.

12. The non-transitory machine readable medium of claim 9, wherein the machine executable code when executed by the at least one machine further causes the machine to:

identify a new transport accessible to the multicast component;

create a new transport entry, for the new transport, in the transport status information to create updated transport status information; and expose the updated transport status information to the application for data copy request creation.

* * * * *